United States Patent
Binder et al.

(10) Patent No.: US 8,032,293 B2
(45) Date of Patent: Oct. 4, 2011

(54) METHOD OF CONTROLLING AN INTERNAL COMBUSTION ENGINE, IN PARTICULAR A DIESEL ENGINE

(75) Inventors: Simon Binder, Holzgerlingen (DE);
Yüriy Bogachik, Aichtal (DE); Alfred Frommelt, Stuttgart (DE); Kristina Hellstroem, Esslingen (DE); Frank Kirschbaum, Stuttgart (DE); Michael Klier, Wildberg (DE); Lorenzo Matassini, Dresden (DE); Michael Mladek, Karlsruhe (DE); Heiko Moeckel-Lherbier, Leonberg (DE); Gerhard Muenkel, Fellbach (DE); Rudiger Pfaff, Stuttgart (DE); Karsten Scheible, Friolzheim (DE); Martin Schnabel, Sindelfingen (DE); Jürgen Schorr, Mannheim (DE); Bernd Windisch, Aichwald (DE); Matthias Wolf, Neuhausen (DE)

(73) Assignee: Daimler A.G., Stuttgart (DE)

( * ) Notice: Subject to any disclaimer, the term of this patent is extended or adjusted under 35 U.S.C. 154(b) by 720 days.

(21) Appl. No.: 12/157,335

(22) Filed: Jun. 9, 2008

(65) Prior Publication Data

US 2009/0112449 A1   Apr. 30, 2009

Related U.S. Application Data

(63) Continuation-in-part of application No. PCT/EP2006/011325, filed on Nov. 25, 2006.

(30) Foreign Application Priority Data

Dec. 9, 2005 (DE) .......................... 10 2005 058 820

(51) Int. Cl.
G06F 19/00 (2011.01)
F02B 3/08 (2006.01)
F02D 41/04 (2006.01)

(52) U.S. Cl. ......... 701/111; 123/299; 123/435; 701/104

(58) Field of Classification Search .................. 123/299, 123/300, 304, 435, 436, 478, 480, 494; 701/101–105, 110, 111, 114, 115; 73/35.01, 73/35.03, 35.04, 35.09, 35.12, 114.07, 114.16, 73/114.17; 702/182–185
See application file for complete search history.

(56) References Cited

U.S. PATENT DOCUMENTS

| 5,924,404 | A  | * | 7/1999 | Ruman et al. ............ | 123/406.18 |
| 6,367,450 | B1 | * | 4/2002 | Kato ........................ | 123/406.26 |
| 6,941,930 | B2 | * | 9/2005 | Uhl .......................... | 123/406.23 |
| 7,231,289 | B2 | * | 6/2007 | Damitz et al. ............. | 701/104 |

(Continued)

FOREIGN PATENT DOCUMENTS

DE   44 15 826   11/1995

(Continued)

OTHER PUBLICATIONS

Dr. Ing. Norbert Alt et at. "Akustikkalibrierung Für Den Diesel-Kaltstart", MTZ Apr. 2004, pp. 270-274.

(Continued)

*Primary Examiner* — Willis Wolfe, Jr.
(74) *Attorney, Agent, or Firm* — Klaus J. Bach

(57) ABSTRACT

In a method for controlling an internal combustion engine, in particular a diesel internal combustion engine, at least one variable is formed on a cylinder-specific basis, which variable characterizes a respective profile of a combustion in an associated combustion chamber, and the control of cylinder-specific fuel injection parameters is influenced as a function of said at least one variable which characterizes the combustion profile.

12 Claims, 3 Drawing Sheets

U.S. PATENT DOCUMENTS

2005/0039721 A1    2/2005    Truscott et al.

FOREIGN PATENT DOCUMENTS

| DE | 197 05 463 | 8/1998 |
| DE | 199 31 985 | 1/2001 |
| DE | 100 11 621 | 9/2001 |
| DE | 100 11 630 | 9/2001 |
| DE | 102 15 674 | 10/2003 |
| DE | 102 18 736 | 11/2003 |
| DE | 102 40 492 | 3/2004 |
| DE | 103 16 113 | 10/2004 |
| DE | 103 58 196 | 7/2005 |
| EP | 1 132 606 | 9/2001 |
| EP | 1 538 325 | 6/2005 |
| EP | 1 593 824 | 11/2005 |
| EP | 1 607 609 | 12/2005 |
| JP | 2005120960 A * | 5/2005 ............ 701/104 |
| WO | WO 0186132 A1 * | 11/2001 ............ 701/104 |

OTHER PUBLICATIONS

P. Carlucci et al., "Pilot Injection Behavioer and Its Effects on a Combustion Common Rail Diesel Engine", Univ. of Lecce, Dept. of Eng., Research Center for Energy and Environment (CREA) 2001.

Michael Traver et al., "Network-Based Diesel Engine Emissions Prediction Using IN-Cylinder Combustion Pressure", SAE Technical Paper Series, 1999-01-1532, May 1999.

* cited by examiner

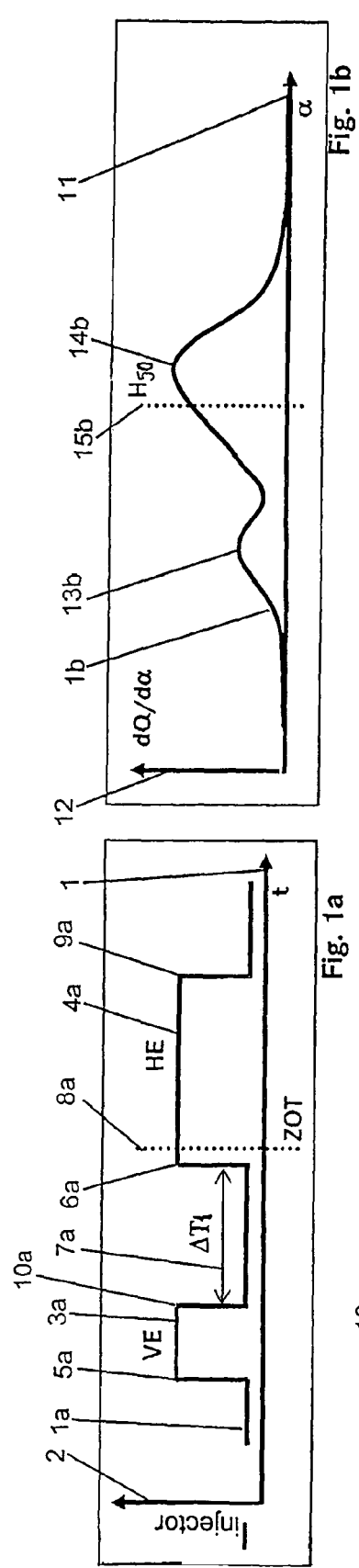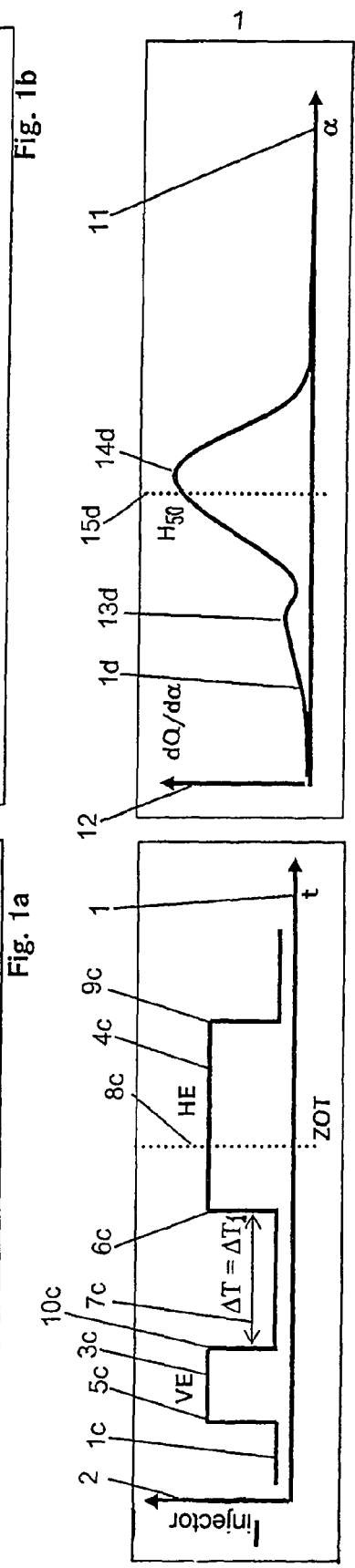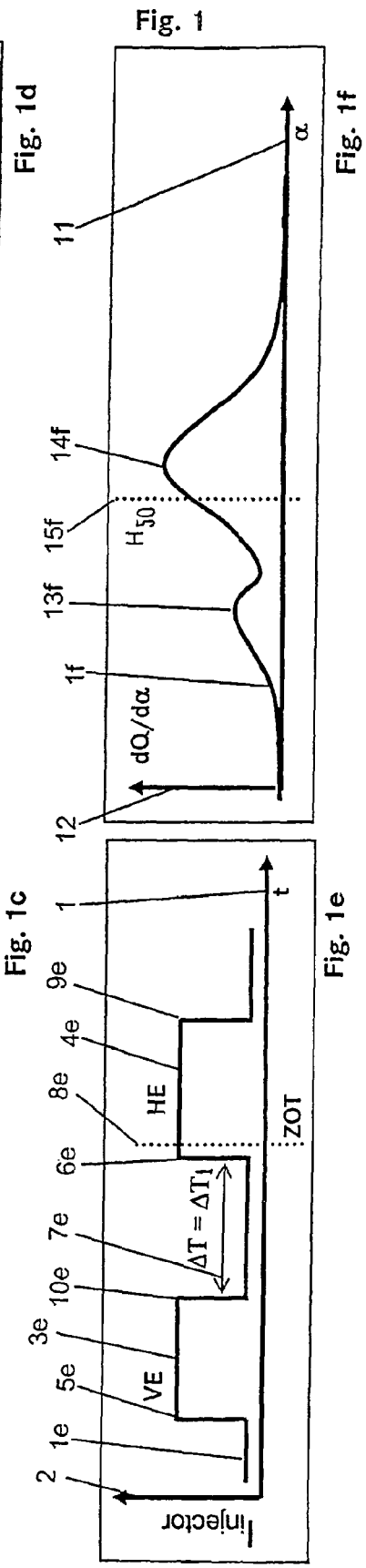

METHOD OF CONTROLLING AN INTERNAL COMBUSTION ENGINE, IN PARTICULAR A DIESEL ENGINE

This is a Continuation-In-Part Application of pending International patent application PCT/EP2006/011325 filed Nov. 25, 2006 and claiming the priority of German patent application 10 2005 058 820.4 filed Dec. 9, 2005.

BACKGROUND OF THE INVENTION

The invention relates to a method of controlling an internal combustion engine, in particular an auto-ignition internal combustion engine on the basis of a cylinder-specific variable which characterizes a combustion profile in an associated combustion chamber.

The German laid-open specification DE 197 05 463 A1 discloses a method and a device for controlling an internal combustion engine, in particular a diesel internal combustion engine. Here, inadmissibly high combustion peak pressures are to be avoided and at the same time exhaust-gas emissions should as far as possible not be adversely affected. For this purpose, either one or each cylinder is assigned a combustion chamber pressure sensor. The injection of the fuel takes place so as to generate the most favorable emissions values possible. If the combustion chamber pressure however reaches a maximum limit value, the injection is altered such that the combustion chamber pressure drops. In physical terms, the fuel injection times and/or the fuel quantities being injected are manipulated as control variables.

This approach however can no longer meet the requirements of modern, in particular supercharged diesel internal combustion engines with regard to an increased efficiency, increased comfort or lower emissions since for example the noise generation cannot be measured or influenced by means of these methods.

It is the object of the present invention to provide a method of controlling an internal combustion engine, in particular a supercharged auto-ignition or diesel internal combustion engine, in such a way that the ever stricter emission limits can be reliably adhered to and the rising demands for comfort and efficiency are simultaneously met.

SUMMARY OF THE INVENTION

In a method for controlling an internal combustion engine, in particular an auto-ignition internal combustion engine, at least one variable is formed on a cylinder-specific basis, which variable characterizes a respective profile of a combustion in an associated combustion chamber, and the control of cylinder-specific fuel injection parameters is manipulated as a function of said at least one variable which characterizes the combustion profile.

The method according to the invention has the advantages over the prior art that not only the maximum combustion chamber pressure is taken into consideration as a single criterion for controlling the fuel metering, but rather other or further suitable variables can also be incorporated into the control procedure. In this way, the combustion profile can be evaluated more effectively and, consequently, the fuel metering and injection timing parameters which influence said combustion profile to the greatest extent can be controlled more effectively. Higher power and torque values with simultaneously improved fuel consumption and emission values are the resulting measurable advantages.

In one preferred embodiment of the invention, the variable which characterizes the combustion profile is formed on the basis of a structure-borne noise measurement, on the basis of a knock sensor output signal or on the basis of a measured combustion chamber pressure profile. Sensors, measuring and evaluation processes for said physical variables are already known and available or are presently being developed, such that it is possible using known means to make reliable statements regarding the profile of a combustion process.

One particularly preferred embodiment resides in forming an indicated mean effective pressure (IMEP) value from the measured combustion chamber pressure profile as a function of a crank angle of a crankshaft of the internal combustion engine and forming a variable which characterizes the combustion profile, in the form of an (energy) conversion point or combustion point or an approximation thereto ($H_{xx}$, MBF [mass burned fraction]), from the indicated pressure profile. These are also known measurement and evaluation methods (known for example from DE 102 18 736 A1 and the documents cited therein) which, in connection with the invention, permit a good assessment of the combustion process which is taking place.

A particularly simple assessment of the combustion process is possible if the combustion center point ($H_{50}$) or an approximation thereof is formed as a characteristic variable ($H_{xx}$) from the indicated pressure profile, since the center point of combustion (also referred to as the combustion or energy conversion center) at which 50% of the injected fuel quantity has been burned has a particularly high level of informative value.

In various advantageous embodiments of the invention, a particular variable which characterizes the combustion profile is optimally taken into consideration for influencing the injection process. Depending on the specifications for the injection process as to whether or not for example one or more pilot injections should take place, it is possible for features from claims 8 to 13 to be applied individually or in combination to optimize the combustion process. Significant here is the time interval between the start of a (pilot or main) injection and a combustion or conversion point, in particular the combustion center of gravity. On account of length and running time differences, production and other tolerances along the air path, the position of the combustion center of gravity or of some other conversion point is different from cylinder to cylinder.

By means of a cylinder-specific determination of the combustion center of gravity or of some other conversion point, and the cylinder-specific injection which is adapted thereto, it is possible for an alignment of a cylinder-typical power or of a cylinder-typical combustion noise to be carried out across all of the cylinders, such that fewer oscillations and vibrations which are associated with noise occur, and a more uniform power output is generated with fewer emissions.

In particular, a pilot combustion brought about by means of pilot injection(s) also has a significant influence on the combustion noise generated during the combustion process. By means of various variables affecting the combustion profile, it is possible, on the basis of a determined conversion point, in particular of the combustion center point, to vary the amounts and timing of the fuel injection in such a way that the combustion noise is controlled in a targeted manner and emissions are reduced.

By means of a so-called "quantity adaptation" in which the entire fuel quantity to be injected is distributed differently between the pilot and main injections, in particular the pilot injection quantity is enlarged and the main injection quantity is reduced, it is possible for the proportion of energy converted at the pilot combustion to be increased and for the proportion of energy converted at the main combustion to be reduced, whereby the level of combustion noise is noticeably reduced. This can be used in order to reduce a noise level at a certain operating point so as to be closer to a lower noise level of adjacent operating points. In order to reduce smoke, it is possible in the inverse case for the pilot injection quantity to be reduced and for the main injection quantity to be increased.

Finally, it can be advantageous for the variable ($H_{XX}$, $H_{50}$) which characterizes the combustion profile to influence devices arranged in the air supply path so as to affect an exhaust-gas recirculation rate, an air mass, a throttle flap position or a setting of a supercharger (turbocharger, electrical supercharger).

With said option, it is possible to set the optimum quantity of recirculated exhaust gas for all operating points, such that the efficiency of the combustion process is further increased and emissions are reduced.

In a further advantageous embodiment of the invention, it is provided that a noise estimation is carried out on the basis of the measured combustion chamber profile. Measurement and evaluation methods are known or are being developed for this purpose too, and therefore the expenditure to be able to make a reliable statement regarding an important emissions value is quantifiable and justifiable also in this respect.

In connection with a particularly advantageous refinement of the invention wherein a variable formed on the basis of the noise estimation influences a start of injection, an injection duration, an apportionment or a magnitude of a fuel quantity to be injected, it is also possible to directly influence the noise which the internal combustion engine generates and emits during the combustion process. Since the targeted influencing of the noise takes place in a cylinder-specific manner, it is thereby possible to generate an (acoustic) equalization, that is to say a uniform noise (level) in all cylinders, and to targetedly reduce or increase the overall noise level.

It is thereby for example also possible to adapt the noise level of the engine to the profile of the rotational speed or the load. It is thereby possible, for example during an acceleration process, to provide acoustic feedback to the driver regarding the increasing rotational speed and vehicle speed.

It is thereby also possible in a simple manner to realize a comfort-increasing smoothing, that is to say homogeneous distribution, of the combustion or engine noise across all rotational speed or operating ranges. It is possible here, in particular in rotational speed or operating ranges in which certain noise components which originate primarily from the engine become unpleasantly perceptible, for example the "rattling" at idle or in the starting range when the engine is still cold or the "spattering" at the transition from small to medium loads when the charge pressure is still low, for the noise level of a certain rotational speed or operating range to be targetedly reduced and for the noise level of adjoining ranges to be targetedly increased such that, with changing rotational speed or with changing operating range, a change in the noise level takes place smoothly which greatly increases comfort since the homogeneity of the noise level over rotational speed or operating ranges is perceived more than the overall noise level.

With ever more stringent emissions limits, this is of increasing significance. Engine-internal measures for preventing pollutant or particle discharge contribute significantly to an ever-increasing very inhomogeneous operating-range-typical and rotational-speed-range-typical generation of noise, for example to very noisy operating points being generated on the one hand during "hard" combustion while the noise level is on the other hand noticeably reduced by means of exhaust-gas recirculation or the use of a particle filter. In light of a falling overall noise level, noisy operating points or ranges become ever more accentuated. This can be effectively counteracted with the proposed measures according to the invention.

The invention will become more readily apparent from the following description of an exemplary embodiment with reference to the accompanying drawings:

BRIEF DESCRIPTION OF THE DRAWINGS

FIGS. 1 to 1f show, in three diagrams, the time profile of three different injection processes (FIGS. 1a, 1c, 1e), and in three further diagrams the profile of respectively associated combustion profiles (FIGS. 1b, 1d, 1f) over a crank angle α.

DESCRIPTION OF PARTICULAR EMBODIMENTS

Figure 2:
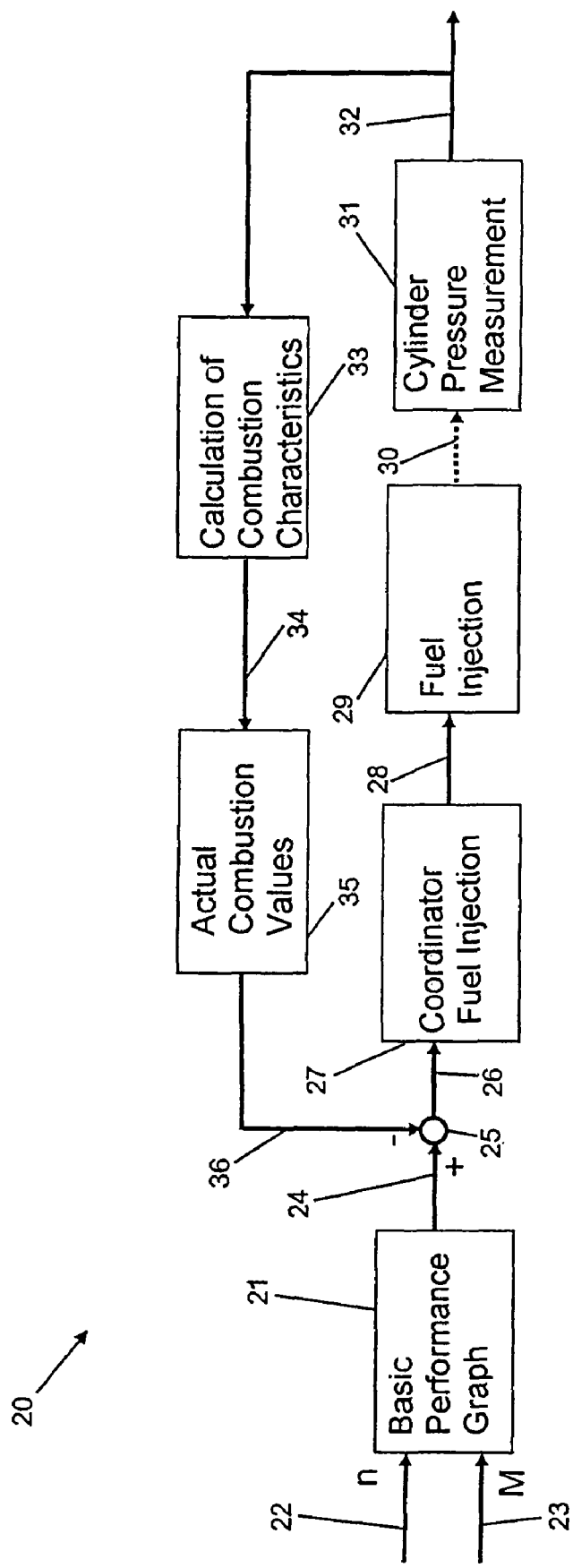
FIG. 2 shows a first control arrangement for controlling the fuel metering.

The invention is suitable for controlling an internal combustion engine, in particular an auto-ignition internal combustion engine in a vehicle.

The object of the invention is to establish a combustion process, which is carried out in a targeted and optimal manner, in the combustion chamber of an auto-ignition internal combustion engine. In particular by means of the injection procedure of a fuel, that is to say by apportioning the fuel quantity to be injected into one or more pilot injections and a main injection, the respective injection quantity, the respective start of injection and the respective injection duration a decisive influence on the combustion process and its profile can be decisively influenced.

The assessment of a combustion process and its profile expediently takes place by means of suitable combustion features which are measured directly or indirectly, in particular by means of corresponding sensors, and which are processed further for the purpose of combustion regulation. Results of a combustion process which is regulated in this way are increased torque and power values with simultaneously reduced consumption and emissions values. In particular, it is possible by means of the invention for the noise emissions of the internal combustion engine to be reduced and influenced in a targeted manner.

A combustion control arrangement in particular for an auto-ignition internal combustion engine is described in the exemplary embodiment below.

FIGS. 1a-1f show, in three diagrams, the time profile of three different injection processes (FIGS. 1a, 1c, 1e), and in three further diagrams, the profile of respectively associated combustion processes (FIGS. 1b, 1d, 1f) over a crank angle α. Here, in the diagrams of FIGS. 1a, 1c and 1e, the time (t) is plotted in each case on a first axis 1 and an activation current ($I_{injector}$) for an injector which belongs to a cylinder is plotted in each case on a second axis 2. In the diagrams of FIGS. 1b, 1d and 1f, the crank angle (α) of a crankshaft of an internal combustion engine is plotted in each case on a first axis 11 and a combustion profile (dQ/dα) in the associated cylinder is plotted in each case on a second axis 12. Instead of the time (t), it is also possible for the crank angle (α) to be plotted on the axis 1.

In the injection processes (FIGS. 1a, 1c, 1e) and in the combustion profiles (FIGS. 1b, 1d, 1f), where reference is made to identical features, identical numbers have been used as reference symbols, with said numbers being supplemented by the respective letters of the relevant figure. In FIG. 1a, according to a curve 1a, a pilot injection 3a is carried out before a main injection 4a. Alternatively, it is also possible for a plurality of pilot injections to be carried out. The pilot injection 3a takes place from an injection start point 5a to an injection end point 10a, the main injection 4a takes place at an injection time 6a, and there is a time interval ($\Delta T$, $\Delta T_1$) 7a between the end of the pilot injection 3a and the start 6a of the main injection 4a. At a time (ITDC) 8a, a cylinder in a combustion chamber has reached a top dead center position. At a time 9a, the main injection 4a is ended.

A pilot combustion 13b takes place on account of the pilot injection 3a at the time 5a (FIG. 1a), and a main combustion 14b takes place on account of the main injection 4a. A so-called combustion- or energy conversion center point ($H_{50}$) 15b indicates that 50% of the injected fuel quantity has been burned. Said $H_{50}$ combustion- or energy conversion center point 15b is a distinctive feature for the assessment of the combustion profile, though it is also possible instead or in addition for any other desired combustion- or energy conversion point ($H_{XX}$, where $0 \leq XX \leq 100$) to be taken into consideration for the assessment of the combustion profile.

The type of injection illustrated in FIG. 1a by curve 1a, as takes place conventionally, with a pilot injection 3a and a main injection 4a and defined injection times 5a, 6a, leads to the typical combustion profile illustrated in FIG. 1b by curve 1b.

In FIG. 1c, the injection illustrated by the curve 1c is altered in relation to the curve 1a in FIG. 1a merely in such a way that the injection start times 5c and 6c and the injection end times 10c and 9c have been brought forward, relative to the injection start times 5a and 6a and the injection end times 10a and 9a, uniformly in relation to the ITDC 8a or 8c.

The injection quantities of the pilot injection 3c and of the main injection 4c accordingly remain unchanged in relation to the injection quantities in FIG. 1a (pilot injection 3a, main injection 4a) since, during the pilot injection 3c and main injection 4c, the injector is energized for exactly the same length of time as during the pilot injection 3a and the main injection 4a. The time intervals 7a and 7c between the pilot injection 3a, 3c and the main injection 4a, 4c are likewise equally long. The variations in the curve 1c result in a "block displacement" in relation to the curve 1a.

As a result of the injection process as per FIG. 1c, it can be seen from the curve 1d in FIG. 1d that, corresponding to the block displacement of the injection (curve 1c, FIG. 1c in relation to curve 1a, FIG. 1a), the pilot combustion 13d takes place earlier and is less pronounced than the pilot combustion 13b, that is to say a lower conversion of energy takes place during the pilot combustion 13d than during the pilot combustion 13b.

The main combustion 14d is however more pronounced than the main combustion 14b, and the energy conversion is thus greater and takes place earlier, which can be seen from the fact that the combustion center point $H_{50}$ 15d is reached at an earlier crank angle $\alpha$ than the combustion center point $H_{50}$ 15b. The flanks of the curve 1d during the main combustion 14d are also steeper than those of the curve 1b during the main combustion 14b, which means that the main combustion 14d is a "hard" combustion, with a very large pressure rise in the combustion chamber and with a resulting more intense combustion noise.

In contrast to the curve 1c in FIG. 1c, in the curve 1e of FIG. 1e, a pilot injection 3e is carried out for a longer time duration and a main injection 4e is carried out for a shorter time duration. The pilot injection 3e now ends at a later time 10e (than the pilot injection 3c at the time 10c). After a time interval 7e which is equal in length to the time intervals 7a and 7c, the main injection 4e begins at a time 6e which lies closer to ITDC 8e than the time 6c does to ITDC 8c, and lasts until a time 9e which corresponds to the time 9c. Here, the ITDC 8e corresponds to the ITDC 8c and to the ITDC 8a.

In the injection as per FIG. 1e, a so-called (pilot injection) quantity adaptation is carried out, in which (for example in relation to the injection process of FIG. 1a or 1c) a certain quantity of fuel more (or else less) is injected during the pilot injection 3e and, correspondingly, said certain quantity of fuel less (or more) is injected during the main injection 4e; the entire fuel quantity to be injected is thus apportioned between the pilot injection 3e and main injection 4e in a different ratio.

As a result of the injection process as per FIG. 1e, it can be seen from the combustion profile of FIG. 1f in the form of the curve 1f that the pilot combustion 13f takes place at approximately the same crank angle $\alpha$ as the pilot combustion 13d but is considerably more pronounced than the pilot combustion 13d. The combustion center point $H_{50}$ 15f as a main regulating variable is situated at the same crank angle $\alpha$ as the combustion center point $H_{50}$ 15d, but the curve if is less steep in the region of the main combustion 14f than the curve 1d, and the energy conversion at the extreme point is also not quite as high. During the combustion as per the curve 1f, the total energy conversion is concentrated more on the pilot combustion 13f and less on the main combustion 14f, in contrast to the curve 1d, so that a softer combustion with a less intense combustion noise takes place during the combustion as per the curve 1f as a result of the injection as per the curve 1e.

If the block displacement shown in FIGS. 1c, 1d and the (pilot injection) quantity adaptation shown in FIGS. 1e, 1f is used for each cylinder of an internal combustion engine, then it is thereby possible in a cylinder-specific manner for different combustion processes and energy conversions to be aligned with one another, and therefore for comfort-reducing disturbing noises which can be heard clearly out of the overall noise spectrum to be effectively eliminated. Alternatively, this can also be achieved by means of an adaptation of a respective quantity of a time interval or of a time duration during the pilot injection(s), main injection and, if appropriate, post-injection(s).

FIG. 2 shows a control arrangement 20 for controlling the fuel metering. Stored in a base performance graph 21 are in particular starting or nominal values for the fuel metering, for example values for the start and duration of activation of the pilot and if appropriate post-injection(s) and main injection, and the apportionment of the fuel quantity to be injected. Furthermore, a starting, nominal or other injection quantity or other operating parameters can also be stored in the base performance graph 21. The starting or nominal values are dependent on present operating variables of the internal combustion engine, for which purpose the base performance graph 21 is for example supplied with a rotational speed 22 and a torque 23 of the internal combustion engine as input variables. An output variable 24 of the base performance graph 21 is supplied to a summing or adding junction 25, and an output variable 26 of the summing junction 25 is supplied to a downstream function block 27.

The function block 27 is a coordinator for the injection including the regulation for this purpose, which specifies the characteristic values (output variables 28) required for the injection for each cylinder, inter alia for example the times for energizing to the injectors. The output variable 28 is supplied to a subsequent function block 29, by means of which the actual injection is controlled. For example, the function block 29 initiates the actual start of activation of the pilot, main and if appropriate post-injection(s) and the apportionment of the fuel quantity to be injected.

The (pilot, main or post-) injection(s) are followed by the respective (pilot, main or post-) combustion which manifests itself in a corresponding pressure rise in the cylinder; this has been symbolized by a dotted arrow 30. A subsequent function block 31 indicates that the profile of the cylinder pressure is measured in particular in a cylinder-specific manner, for example directly by means of suitable pressure sensors. Alternatively, the cylinder pressure can also be determined indirectly, for example by means of knock sensors or other structure-borne noise sensors. An output variable 32 from said function block 31 can for example be supplied to a control unit, but is in particular supplied to a downstream function block 33 for calculating combustion features.

From the output signal 32 of the pressure-, knock-, structure-borne noise- or other sensors which directly or indirectly measure the pressure profile, the indicated pressure profile and, from the latter, the combustion profile or the energy conversion which is characteristic of a working cycle of the internal combustion engine and which is suitable for controlling/regulating the combustion process, is determined in the function block 33 for example in a known way (DE 102 18 736 A1, DE 199 31 985 A1).

This results in a combustion profile as illustrated by way of example in FIGS. 1b, 1d and 1f by the curves 1b, 1d and 1f. It is possible for one or more conversion points $H_{xx}$, in particular the conversion center point $H_{50}$, to be determined on the basis of the combustion profile. Actual combustion values are generated in a function block 35 as an output variable 34 of the function block 33.

For the (cylinder-specific) regulation of the combustion, output variables 36 from the function block 35 are supplied to the summing or adding junction 25, where they are subtracted from the nominal values 24 out of the base performance graph 21. The control circuit for combustion regulation is thereby closed.

Figure 3:
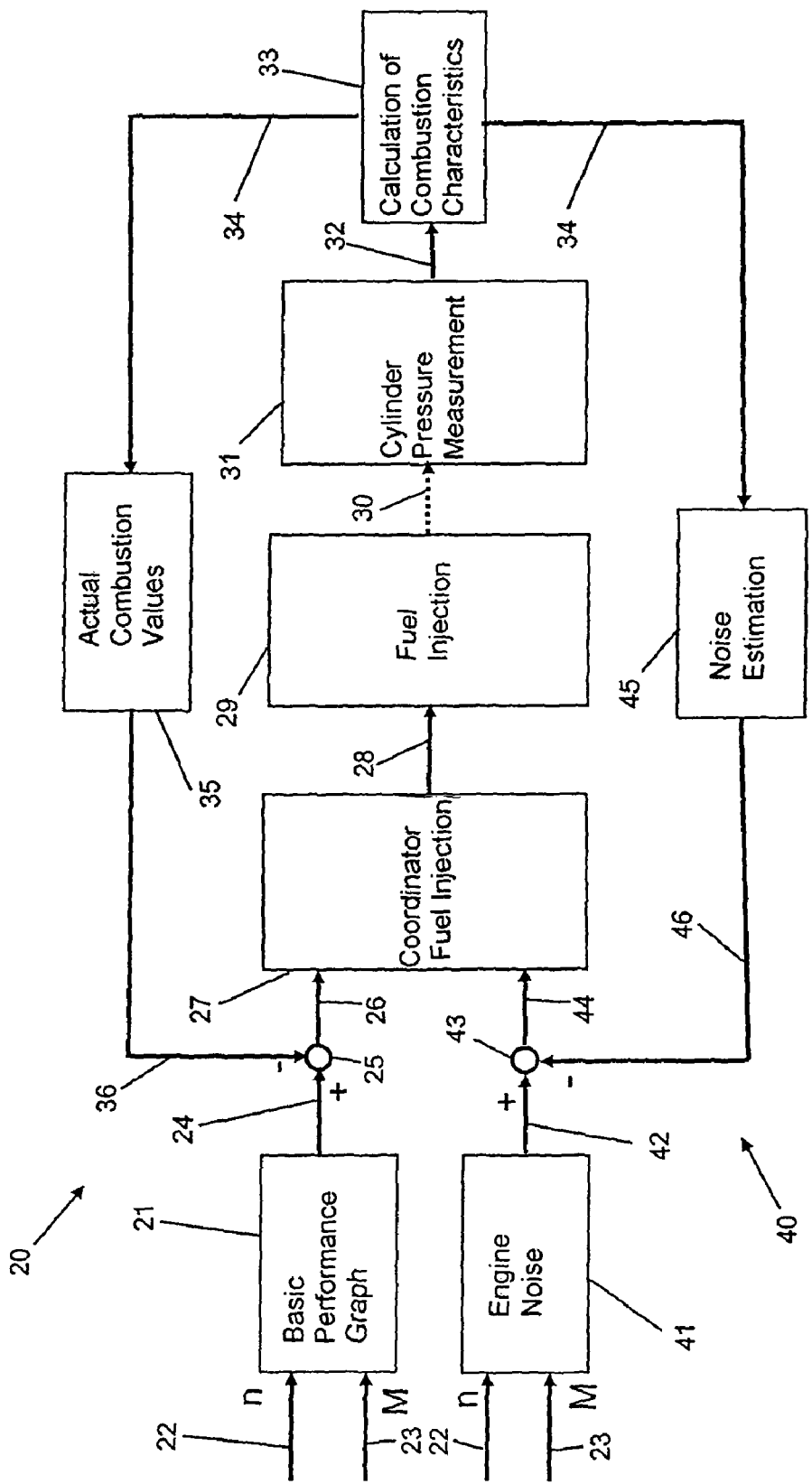
FIG. 3 shows a second control arrangement for controlling the fuel metering, which has been expanded by an additional control loop.

In FIG. 3, the control arrangement 20 of FIG. 2 has been expanded by an additional control loop 40. With the control loop 40 a noise estimation is carried out on the basis of the measured combustion chamber profile, and additionally, a variable (indicated characteristic value LVG2) which is formed on the basis of the noise estimation influences the parameters of the injection (start of injection, injection duration, apportionment or a magnitude of a fuel quantity to be injected).

For this purpose, the rotational speed 22 and the torque 23 or the injection quantity of the internal combustion engine are additionally supplied to a performance graph 41 in which are stored nominal values for the engine noise. Said nominal values are supplied as output variables 42 of the performance graph 41 to a summing or adding junction 43 with an output variable 44. Said output variable 44 is now supplied, like the output variable 26, to the coordinator 27 for the injection, such that the control variable 44 for the engine noise is additionally taken into consideration in the coordinator 27. The subsequent procedure in function blocks 29, 31 and 33 takes place analogously to that in FIG. 2.

In contrast to FIG. 2, the output variable 34 of function block 33 (combustion feature calculation) is supplied to a further function block 45. In said function block 45, an estimation of the engine noise is carried out on the basis of the directly or indirectly measured profile of the cylinder pressure (function block 31) and the combustion features (function block 33) which are calculated from said profile. Alternatively, the noise estimation in the function block 45 can also be carried out on the basis of other or further sensors and their signals, for example by means of structure-borne noise sensors, in particular knock sensors. As an output signal 46 of the function block 45, actual noise values are supplied to the summing or adding junction 43 and are subtracted there from the nominal values 42.

With the control arrangement shown in FIGS. 2 and 3, it is possible to obtain an optimum combustion profile or energy conversion as illustrated in FIGS. 1b, 1d, 1f. A lower overall level of combustion noise is obtained by means of a cylinder-specific control. By means of the control structure according to FIG. 3 in particular, the combustion noise can change with the rotational speed, such that acoustic feedback is provided to the driver in particular with increasing vehicle speed.

What is claimed is:

1. A method for controlling an internal combustion engine, in particular a diesel internal combustion engine, comprising the steps of:
forming at least one variable ($H_{XX}$, $H_{50}$) on a cylinder-specific basis, which variable characterizes a respective profile of a combustion in an associated combustion chamber on the basis of a measured combustion chamber pressure profile,
forming an indicated mean effective pressure (IMEP) value and an indicated pressure profile from the measured combustion chamber pressure profile as a function of a crank angle of a crankshaft of the internal combustion engine,
forming a variable which characterizes the combustion profile, in the form of one of an (energy) conversion point, and a combustion point ($H_{XX}$, $H_{50}$) or an approximation thereto from the indicated pressure profile, which variable ($H_{XX}$, $H_{50}$), characterizes the combustion profile and influences the time interval between a start (5) of a pilot injection (3) and the occurrence (15) of the variable ($H_{XX}$, $H_{50}$) and
controlling cylinder-specific fuel injection parameters as a function of said at least one variable ($H_{XX}$, $H_{50}$) which characterizes the combustion profile.

2. The method as claimed in claim 1, wherein the variable ($H_{XX}$, $H_{50}$) which characterizes the combustion profile is formed on the basis of a structure-borne noise measurement.

3. The method as claimed in claim 1, wherein the variable ($H_{XX}$, $H_{50}$) which characterizes the combustion profile is formed on the basis of a knock sensor output signal.

4. The method as claimed in claim 1, wherein the combustion center point ($H_{50}$) or an approximation thereto is formed as a characteristic variable ($H_{XX}$) from the indicated pressure profile.

5. The method as claimed in claim 1, wherein the variable ($H_{XX}$, $H_{50}$) which characterizes the combustion profile influences one of a start of injection (5, 6), an injection duration, an apportionment (3, 4) and a magnitude of a fuel quantity to be injected.

6. The method as claimed in claim 1, wherein the variable ($H_{XX}$, $H_{50}$) which characterizes the combustion profile influences a time interval between a start of an injection (5, 6) and the occurrence (15) of the variable ($H_{XX}$, $H_{50}$) which characterizes the combustion profile.

7. The method as claimed in claim 1, wherein the variable ($H_{XX}$, $H_{50}$) which characterizes the combustion profile and influences the time interval between the start (5) of the pilot injection (3) and the occurrence of the combustion center of gravity ($H_{50}$).

8. The method as claimed in claim 1, wherein the variable ($H_{XX}$, $H_{50}$) which characterizes the combustion profile influences the time interval between a start (5) of a pilot injection (3) and the start (6) of a main injection (4).

9. The method as claimed in claim 1, wherein the variable ($H_{XX}$, $H_{50}$) which characterizes the combustion profile influences the apportionment of the fuel quantity to be injected between an injection quantity of the pilot injection (3) and an injection quantity of the main injection (4).

10. The method as claimed in claim 1, wherein the variable ($H_{XX}$, $H_{50}$) which characterizes the combustion profile influences an exhaust-gas recirculation rate, an air mass or a throttle flap position.

11. The method as claimed in claim 1, wherein a noise estimation (45) is carried out on the basis of the measured combustion chamber profile.

12. The method as claimed in claim 11, wherein a variable (LVG2) formed on the basis of the noise estimation (45) is used to influence at least one of a start of injection (5, 6), an injection duration, an apportionment (3, 4) and a fuel quantity to be injected.

* * * * *